(12) United States Patent
Bailliu et al.

(10) Patent No.: US 10,299,436 B2
(45) Date of Patent: May 28, 2019

(54) INTEGRATED REVERSING SYSTEM WITH BELT ENGAGEMENT

(71) Applicant: CNH Industrial America LLC, New Holland, PA (US)

(72) Inventors: Stijn Bailliu, Ichtegem (BE); Nico J. M. Wolfcarius, Wakken (BE); Ruben J. Vancoillie, Rumbeke (BE)

(73) Assignee: CNH Industrial America LLC, New Holland, PA (US)

( * ) Notice: Subject to any disclaimer, the term of this patent is extended or adjusted under 35 U.S.C. 154(b) by 97 days.

(21) Appl. No.: 15/467,797

(22) Filed: Mar. 23, 2017

(65) Prior Publication Data
US 2017/0273243 A1    Sep. 28, 2017

(30) Foreign Application Priority Data

Mar. 23, 2016    (BE) .................................. 2016/5205

(51) Int. Cl.
| | | |
|---|---|---|
| *A01D 41/14* | (2006.01) | |
| *A01D 69/00* | (2006.01) | |
| *A01D 41/06* | (2006.01) | |
| *A01D 69/06* | (2006.01) | |
| *F16H 7/08* | (2006.01) | |

(52) U.S. Cl.
CPC ............ *A01D 69/005* (2013.01); *A01D 41/06* (2013.01); *A01D 41/142* (2013.01); *A01D 69/06* (2013.01); *F16H 7/0827* (2013.01); *F16H 2007/0865* (2013.01); *F16H 2007/0891* (2013.01)

(58) Field of Classification Search
CPC ........ A01D 69/00–69/12; A01D 41/06; A01D 41/142; A01D 61/00–61/04; F16H 7/0827; F16H 2007/0865; F16H 2007/0891

USPC ........................................................ 156/11.2
See application file for complete search history.

(56) References Cited

U.S. PATENT DOCUMENTS

| | | | |
|---|---|---|---|
| 2,930,246 A | | 3/1960 | Johnson et al. |
| 3,396,590 A | * | 8/1968 | Verdery, Jr. ............... F16H 3/00 254/359 |
| 4,046,022 A | * | 9/1977 | Henderson ................ F16H 9/04 474/133 |
| 4,430,847 A | * | 2/1984 | Tourdot ............. A01D 41/1274 474/1 |
| RE32,599 E | * | 2/1988 | Musser .................. A01D 69/00 56/10.8 |
| 4,879,868 A | * | 11/1989 | Love .................... A01D 41/142 56/11.2 |

(Continued)

FOREIGN PATENT DOCUMENTS

| | | |
|---|---|---|
| CA | 2110778 A1 | 6/1995 |
| DE | 69532870 T2 | 8/2004 |

(Continued)

*Primary Examiner* — Robert E Pezzuto
*Assistant Examiner* — Adam J Behrens
(74) *Attorney, Agent, or Firm* — Patrick M. Sheldrake; Peter K. Zacharias

(57) ABSTRACT

An agricultural harvester has a header and feeder drive system including a forward belt drive arrangement and a reverse belt drive arrangement. The forward belt drive arrangement includes a forward drive belt and a forward belt drive tensioner operated by an actuator. The reverse belt drive arrangement includes a reversing motor and a reverse drive belt selectively engaged with the feeder drive system by operation of the same actuator.

11 Claims, 7 Drawing Sheets

(56) References Cited

U.S. PATENT DOCUMENTS

| | | | |
|---|---|---|---|
| 5,679,083 A | | 10/1997 | Eom |
| 5,778,644 A | * | 7/1998 | Keller .................. A01D 41/142 56/11.2 |
| 5,996,324 A | * | 12/1999 | Oligmueller ........... A01D 69/00 56/11.2 |
| 6,644,006 B1 | * | 11/2003 | Merritt .................. A01D 69/00 56/11.2 |
| 7,052,423 B2 | * | 5/2006 | Jonckheere .......... A01D 41/142 474/148 |
| 9,750,194 B2 | * | 9/2017 | Vandamme ......... A01F 15/0841 |
| 2005/0181900 A1 | * | 8/2005 | Jonckheere .......... A01D 41/142 474/117 |

FOREIGN PATENT DOCUMENTS

| | | | | |
|---|---|---|---|---|
| DE | 60300438 T2 | 8/2006 | | |
| DE | 102014004227 A1 | 10/2015 | | |
| FR | 2667123 A1 | 3/1992 | | |
| WO | WO-2015045631 A1 | * | 4/2015 | ........... F04D 25/022 |

* cited by examiner

INTEGRATED REVERSING SYSTEM WITH BELT ENGAGEMENT

CROSS REFERENCE TO RELATED APPLICATION

This application claims priority to Belgium Application No. 2016/5205 filed Mar. 23, 2016, the contents of which are incorporated herein by reference.

BACKGROUND OF THE INVENTION

The present invention relates generally to agricultural harvesters such as combines, and more particularly to the drive systems associated with header and feed mechanisms for supplying crop material into the machine for processing, and still more particularly to reverse drive systems that can be activated for backing out crop material when overfeeding or clogging conditions are present, or to otherwise withdraw material from the feed mechanism.

An agricultural harvester known as a "combine" is termed as such historically because it combines multiple harvesting functions, such as picking or cutting, threshing, separating and cleaning in a single harvesting machine. A typical combine includes a header which removes the crop from a field, and a feeder which transports the crop matter into a threshing rotor. The threshing rotor rotates within a perforated housing, which may be in the form of adjustable concaves, and performs a threshing operation on the crop, to dislodge the grain from other crop material. Once the grain is threshed, it falls through perforations in the threshing concaves onto a grain pan. From the grain pan, the grain is cleaned on sieves in a cleaning system. A cleaning fan blows air through the sieves to discharge chaff and other debris toward the rear of the combine. Non-grain crop material, such as straw from the threshing system, proceeds through a residue system, which may utilize a straw chopper to process the non-grain material and direct it out the rear of the combine. The cleaned grain is transported to a grain tank onboard the combine. When the grain tank becomes full or is to be emptied for other reasons, the combine is positioned adjacent a vehicle into which the grain is to be unloaded, such as a semi-trailer, gravity box, straight truck, or the like; and an unloading system on the combine is actuated to transfer the grain from the grain tank into the vehicle.

More particularly, a header can include a cutter bar or other mechanism to sever or remove crop material from the field, and a reel, conveyors, augers and/or other transport devices that gather and direct the cut crop material to feed downstream processing systems in the machine. It is known to cut a wide swath of crop and then to gather the crop inwardly toward the center of the machine from the outer edges, to thereby concentrate the crop stream as it enters subsequent processing systems. Such downstream processing systems can include a rotary threshing or separating system having one or more rotors which can extend axially (front to rear) or transversely (side to side) within the body of the combine, and which are partially or fully surrounded by a perforated concave. The crop material is threshed and separated by the rotation of the rotor within the threshing concave. Coarser non-grain crop materials, such as stalks and leaves, are transported to the rear of the combine and discharged back to the field. The separated grain, together with some finer non-grain crop materials such as chaff, dust, straw, and other crop residue are discharged through the concaves and fall onto a grain pan where they are transported to the cleaning system. Alternatively, the grain and finer non-grain crop material may also fall directly onto the cleaning system itself.

The cleaning system further separates the grain from non-grain crop material, and typically includes a fan directing an airflow stream upwardly and rearwardly through vertically arranged sieves, with the sieves oscillating in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves through the combine. Any grain and/or non-grain crop material remaining on the top surface of the upper sieve is discharged at the rear of the combine. Grain falling through the lower sieve lands on a bottom pan of the cleaning system, where it is conveyed toward a clean grain auger. The clean grain auger conveys the grain to the onboard grain tank for temporary storage.

During normal operation of a harvesting machine, the onboard engine powers the various systems, including the crop infeed systems, through mechanical drive line connections. For example, through the use of various shafts, belt drives, chain drives and the like, several augers, conveyors or other mechanisms of the header and infeed systems can be driven in unison. Under some operating conditions, crop material can clump or bunch, forming a potential clog that can interrupt continued performance, or even plug the machine. To prevent or eliminate this condition, the crop material can be moved backwards from its normal travel direction to remove, reposition or redistribute the clump of material. It is impractical and undesirable to reverse the entire drive system, so it is known to use separate reversing drive motors to reverse drive more limited groupings of the mechanisms. The main or forward drive is interrupted, and the reversing drive is operated. However, to integrate the reversing drive motor into the drive line can be difficult, complicated and costly. A hydraulic motor with an appropriate clutch for engagement to and disengagement from the drive line can require significant space in the machine and the various parts therefore can be expensive. Complex systems can be difficult and expensive to repair and maintain.

What is needed in the art is a reversing system drive arrangement that is compact and simple in operation and use, for selectively decoupling the primary drive system and coupling the reversing system when needed.

SUMMARY OF THE INVENTION

The present invention provides a reversing drive system integrated with the primary drive system in such a way that a single actuator disengages one when engaging the other, to drivingly couple or decouple a reversing motor in the system.

The invention in one form is directed to an agricultural harvester provided with a chassis, a header, a feed housing and an engine all carried by the chassis. A header and feeder drive system operates the header and feed housing systems, and includes a forward belt drive arrangement with a forward drive belt arranged about a first pulley and a second pulley and a forward belt drive tensioner operated by an actuator to engage and disengage the forward drive belt with the first pulley and the second pulley. The forward belt drive arrangement is driven by the engine through the interconnection of a driveline. A reverse belt drive arrangement includes a reversing motor selectively coupled to the header and feeder drive system. A reversing motor pulley is driven by the reversing motor, and a reverse drive belt is arranged around the reversing motor pulley either the first pulley or the second pulley. A reverse belt drive tensioner engages and disengages the reverse drive belt with the reversing motor pulley and either the first pulley or the second pulley. A linkage system interconnects the forward belt drive tensioner, the reverse belt drive tensioner and the actuator so that operation of the actuator operates both the forward belt drive tensioner and the reverse belt drive tensioner.

The present invention, in a form thereof, advantageously provides a reversing drive system integrated with the primary drive system to use a common actuator with the primary drive system for engaging one and disengaging the other as needed.

Another advantage of a form of the integrated reversing drive system is that the system is compact and requires minimal space.

BRIEF DESCRIPTION OF THE DRAWINGS

The above-mentioned and other features and advantages of this invention in its various forms, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
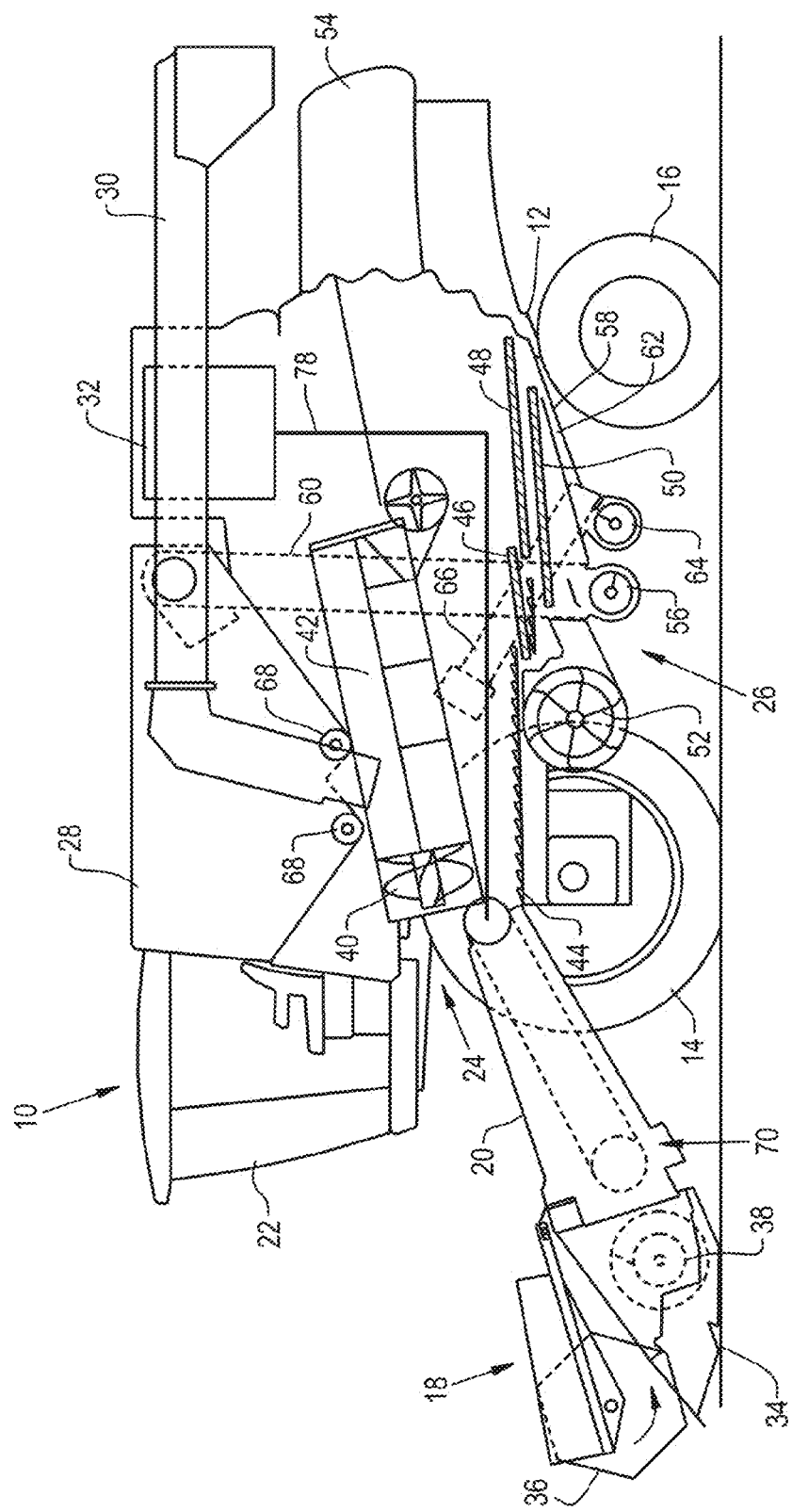
FIG. 1 is a side view of an embodiment of an agricultural harvester in the form of a combine, which includes an integrated reversing system with belt engagement as disclosed herein.

Referring now to the drawings, and more particularly to FIG. 1, there is shown an agricultural harvester in the form of a combine 10, which generally includes a chassis 12, ground engaging front wheels 14 and rear wheels 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, it is also to be understood that combine 10 may include tracks, such as full tracks or half-tracks. It should further be understood that combine 10 is merely exemplary of a harvesting machine for which the integrated reversing system can be used, and harvesting machines of other types including other types of combines, foragers and the like can use the system advantageously.

Header 18 is mounted to the front of combine 10 and includes a cutter bar 34 for severing crops from a field during forward movement of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 generally includes a rotor 40 at least partially enclosed by and rotatable within a corresponding perforated rotor cage or concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Rotor 40 is shown in a representative sense in that rotor 40 may be more than one rotor 40 and may be oriented generally transverse to the direction of travel of combine 10. So also, concave 42 can be more than one concave 42.

Grain that has been separated by threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48, and 50 is subjected to a cleaning action by fan 52, which provides airflow through the sieves to remove chaff and other lightweight impurities, such as dust, from the grain by making the lightweight material airborne for discharge from a straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in fore-to-aft manner to spread the grain across sieves 48, 50, while permitting the passage of cleaned grain by gravity through the openings of sieves 48, 50.

Clean grain falls to a clean grain auger 56 positioned crosswise below and at the front of lower sieve 50. Clean grain auger 56 receives clean grain from each sieve 48, 50 and from a bottom pan 62 of cleaning system 26. Clean grain auger 56 conveys the clean grain laterally to a generally vertically arranged grain elevator 60 for transport to the grain tank 28. Tailings from cleaning system 26 fall to a tailings auger trough 58, and are transported via a tailings auger 64 and a return auger 66 to the upstream end of the cleaning system 26 for repeated cleaning action. A pair of grain tank augers 68 at the bottom of the grain tank 28 conveys the clean grain laterally within the grain tank 28 to the unloading auger 30 for discharge from combine 10.

The non-grain crop material proceeds through a residue handling system and is discharged from straw hood 54. The residue handling system can include a chopper, counter knives, a windrow door and a residue spreader, not shown but well understood and familiar to those skilled in the art.

Figure 2:
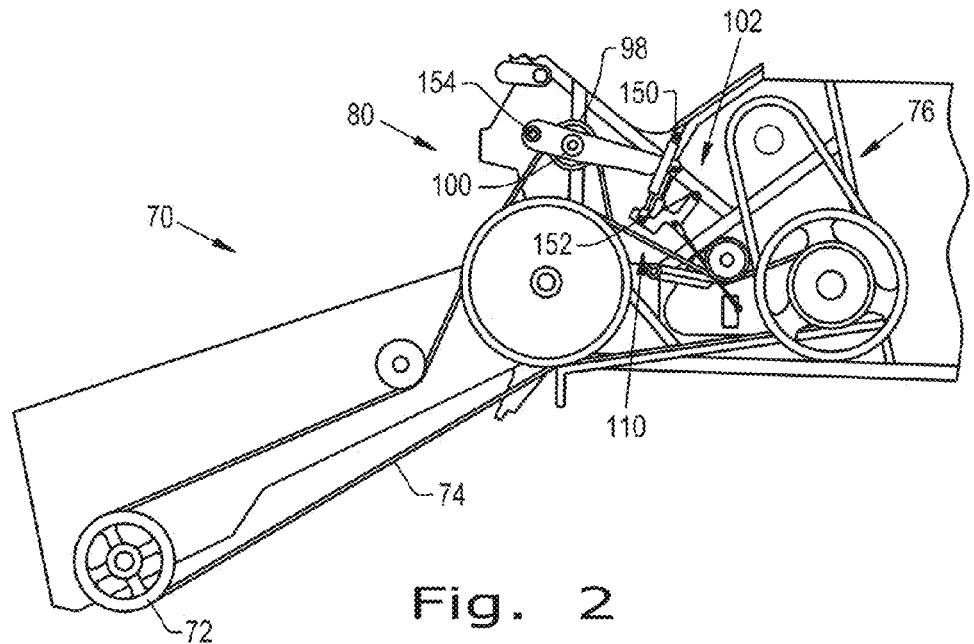
FIG. 2 is a side view of a header and feeder drive system for the combine shown in FIG. 1.

A header and feeder drive system 70, schematically illustrated in FIG. 1, has a reversing belt drive system 80 illustrated in further details in FIG. 2. In addition to the components of reversing belt drive system 80 to be described in greater detail hereinafter, header and feeder drive system 70 can include, for example, a header pulley 72 driven by a drive belt 74 which are downstream in a drivetrain connection to the reversing belt drive system 80, and other drive belts and driving connections 76 upstream in the drivetrain connection to reversing belt drive system 80. It should be understood that header and feeder drive system 70 can include additional pulleys and belts, sprockets and chains and/or shafts and the like to power the aforementioned and other components within header 18 and feeder housing 20, including, for example, cutter bar 34, reel 36 and auger 38.

Header and feeder drive system 70 is powered in its primary function by engine 32 through a driveline 78 depicted schematically in FIG. 1 as a line from engine 32. It should be understood that driveline 78 may include a plurality of shafts, sprocket and chain drives, other belt and pulley drives and the like that operate other mechanisms in the various systems of combine 10, in addition to transmitting power from engine 32 to header and feeder drive system 70. The primary function of header and feeder drive system 70 may be referred to as its forward drive direction, that is, the drive direction and arrangement used when combine 10 is in harvesting mode for removing a crop from a field and processing the crop material.

Figure 3:
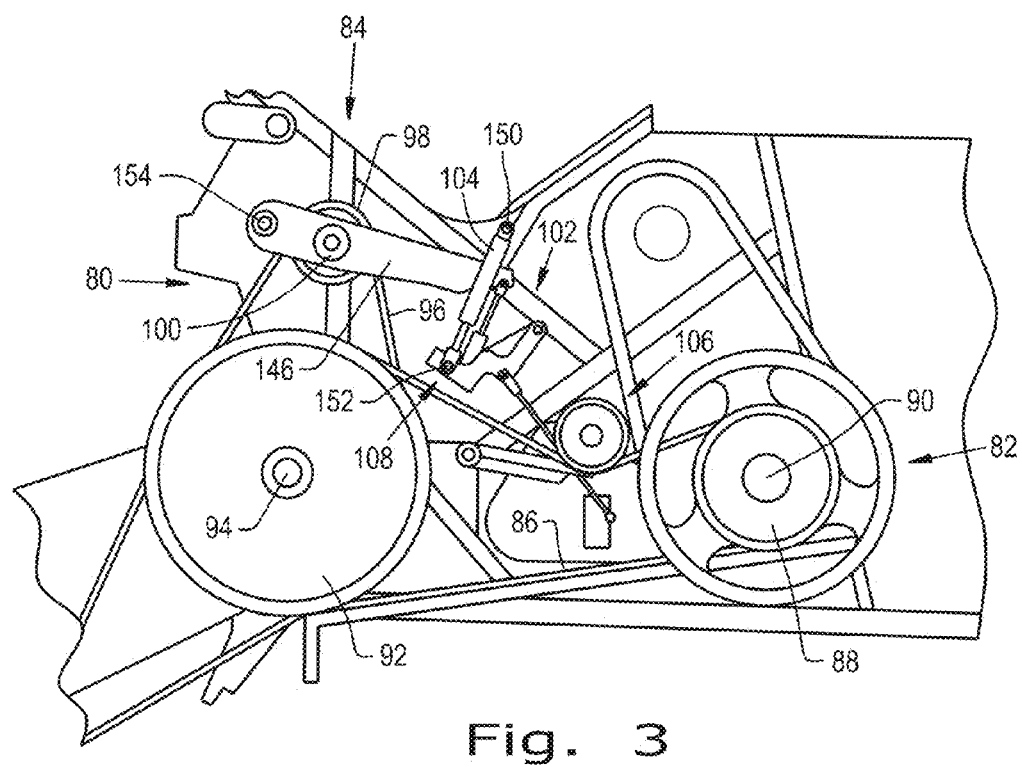
FIG. 3 is an enlarged side view of a reversing belt drive system in the header and feeder drive system.

Referring now to FIG. 2 and FIG. 3, reversing belt drive system 80, which forms a portion of header and feeder drive system 70, includes a forward belt drive arrangement 82 and a reverse belt drive arrangement 84 operationally integrated with forward belt drive arrangement 82. Forward belt drive arrangement 82 is driven by engine 32 through driveline 78 and includes an endless forward drive belt 86 arranged around a first pulley 88 on an intermediate shaft 90 and around a second pulley 92 on a feeder top shaft 94. Intermediate shaft 90 can be drivingly engaged with, for example, cutting mechanisms and initial crop gathering mechanisms of header 18 and feeder top shaft 94 can be drivingly engaged with, for example, a chain conveyor or other feeding mechanisms of feeder housing 20.

Reverse belt drive arrangement 84 includes an endless reverse drive belt 96 arranged around a pulley 98 of a reversing motor 100 and around the aforementioned second pulley 92 on feeder top shaft 94.

An integrated tensioning system 102 is provided for and operatively coupled with forward belt drive arrangement 82 and reverse belt drive arrangement 84. Integrated tensioning system 102 includes an actuator 104, a forward belt drive tensioner 106, a reverse belt drive tensioner 108 and a linkage system 110 that connects actuator 104 and tensioners 106 and 108 to forward belt drive arrangement 82 and reverse belt drive arrangement 84.

Tensioners 106 and 108 are operable to increase or decrease the tension of forward drive belt 86 and reverse drive belt 96 against the pulleys about which they are arranged. Accordingly, each can be moved in a manner to increase the drive belt tension sufficiently so that driving force can be transmitted between the pulleys and, alternatively, moved in a manner to decrease tension sufficiently so that driving force is not transmitted between the pulleys. Linkage system 110 interconnects actuator 104 and tensioners 106, 108 such that the tensioners are operated in unison but in the opposite effect. When one tensioner is moved to increase tension of the drive belt with which it is associated the other tensioner is moved to decrease tension of its associated drive belt. Accordingly, by the operation of a single actuator 104, forward belt drive arrangement 82 can be disengaged as reverse belt drive arrangement 84 is engaged, or reverse belt drive arrangement 84 can be disengaged as forward belt drive arrangement 82 is engaged.

Figure 4:
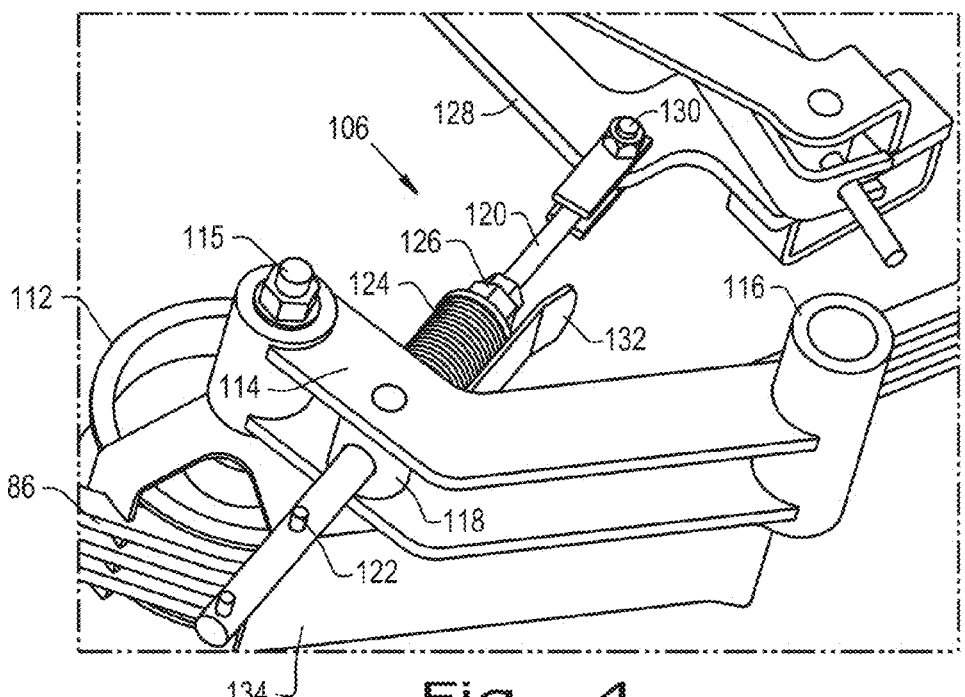
FIG. 4 is a perspective view of a forward belt drive tensioner in the reversing belt drive system.

Forward belt drive tensioner 106 and reverse belt drive tensioner 108 are spring biased devices configured to apply a prescribed degree of force when actuated through the operation of the actuator 104 and the interconnection of linkage system 110. Referring now particularly to FIG. 4, forward belt drive tensioner 106 includes an idler pulley 112 that can be moved toward and away from the outside of forward drive belt 86. Idler pulley 112 is held to a tensioner arm 114 by a rotatable connection 115, and tensioner arm 114 is held in combine 10 by a pivotal attachment 116. Tensioner arm 114 includes a pivot 118 slidably receiving a tension rod 120 extending through pivot 118. A pin 122 extends laterally from tension rod 120 below pivot 118. A spring 124 is disposed on tension rod 120 between an upper stop 126 and pivot 118. The upper end of tension rod 120 is held to an engagement arm 128 by a pivotal connection 130. An indicator or restrictor 132 limits the compression of spring 124 as engagement arm 128 moves downwardly toward tensioner arm 114. A belt guide 134 is provided near, but spaced from idler pulley 112, to hold forward belt 86 sufficiently near idler pulley 112 when idler pulley 112 is moved away so that forward drive belt 86 will reengage idler pulley 112 when idler pulley 112 is moved toward it.

Upon movement of engagement arm 128, tension rod 120 slides relative to pivot 118, thereby compressing or releasing spring 124 between pivot 118 and upper stop 126. Pivot 118 rotates as necessary in tensioner arm 114, and tensioner arm 114 pivots about pivotal attachment 116. Tension rod 120 pivots about pivotal connection 130 relative to engagement arm 128. Accordingly, upward and downward movement of engagement arm 128 as depicted in FIG. 4 is transferred to tensioner arm 114 and thereby causes idler pulley 112 to move toward or away from forward drive belt 86, to increase or decrease tension in forward drive belt 86.

Figure 5:
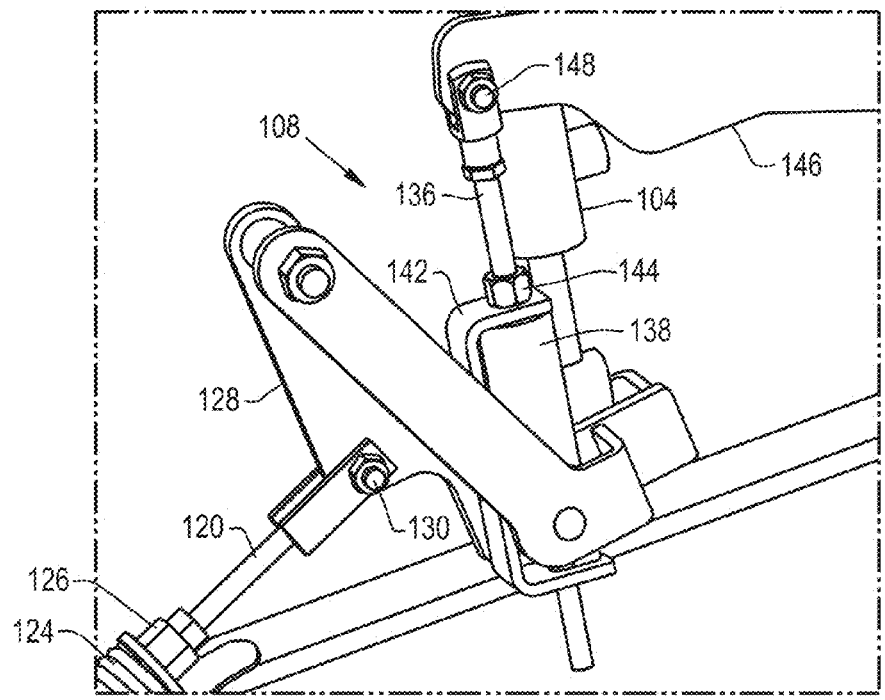
FIG. 5 is a perspective view of a reverse belt drive tensioner in the reversing belt drive system.
Figure 6:
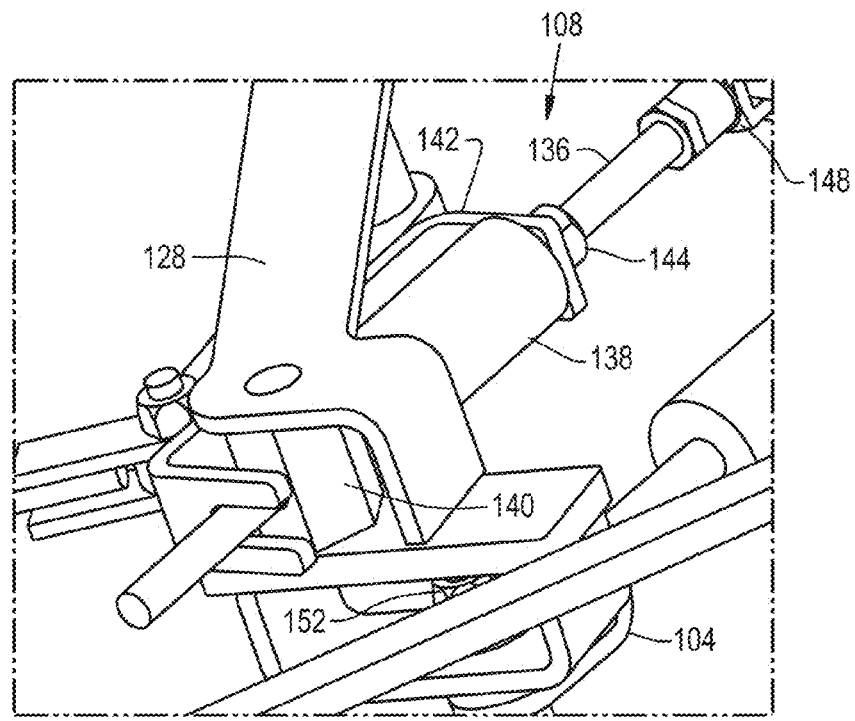
FIG. 6 is another perspective view of the reverse belt drive tensioner, shown from an angle different from that shown in FIG. 5.

Referring now particularly to FIGS. 5 & 6, reverse belt drive tensioner 108 includes an actuator rod 136 with an indicator/restrictor 138 containing a spring 139 (FIGS. 7 & 8) disposed on actuator rod 136. Actuator rod 136 extends through a pivot 140 rotatably held in engagement arm 128. A U-shaped bracket 142 engages actuator rod 136 below pivot 140 and above indicator/restrictor 138 and spring 139. An upper stop 144 is provided on actuator rod 136 above U-shaped bracket 142. An upper end of actuator rod 136 is held to a reverser arm 146 by a pivotal connection 148.

Figure 7:
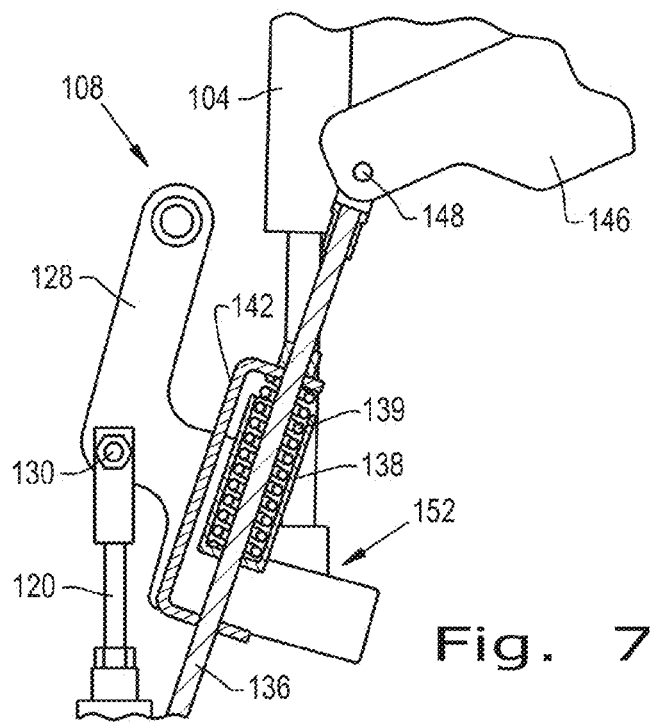
FIG. 7 is a cross-sectional view of the reverse belt drive tensioner in one state of operation.
Figure 8:
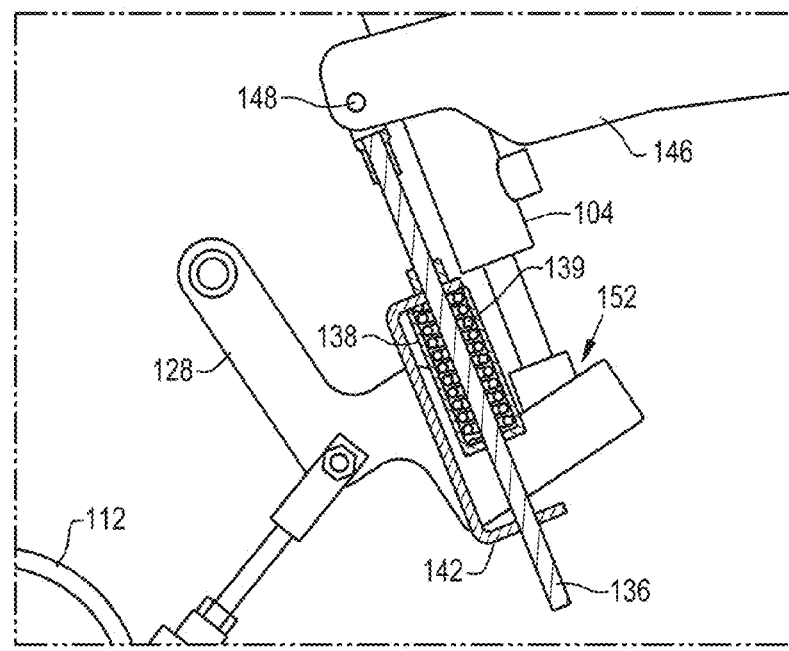
FIG. 8 is a cross-sectional view of the reverse belt drive tensioner in another state of operation, different from that shown in FIG. 7.

FIG. 7 and FIG. 8 are cross-sectional views of reverse belt drive tensioner 108 and show the relative positions of and arrangements for engagement arm 128, reverser arm 146 and actuator 104 with the reverse belt drive arrangement 84 disengaged (FIG. 7) and engaged (FIG. 8). Upon movement of engagement arm 128, sliding movement occurs between actuator rod 136 and pivot 140, thereby compressing or releasing spring 139 in indicator/restrictor 138 between pivot 140 and bracket 142 against upper stop 144. Pivot 140 rotates as necessary in engagement arm 128, and actuator rod 136 pivots about pivotal connection 148 relative to reverser arm 146. Accordingly, upward and downward movement of engagement arm 128 is transmitted to reverser arm 146 and causes reverser arm 146 to move upwardly and downwardly at the end thereof having pivotal connection 148 to actuator rod 136.

Actuator 104 can be a straight line actuator, such as, for example, a hydraulic or pneumatic cylinder; however other types of actuators also can be used. Actuator 104 is connected about a pivotal connection 150 to structure of combine 10 and at the opposite end about a pivotal connection 152 to engagement arm 128, as shown in FIGS. 2 & 3. Accordingly, extending or retracting actuator 104 causes movement of engagement arm 128, which results in the upward or downward movements of tensioners 106, 108 as described above.

Figure 9:
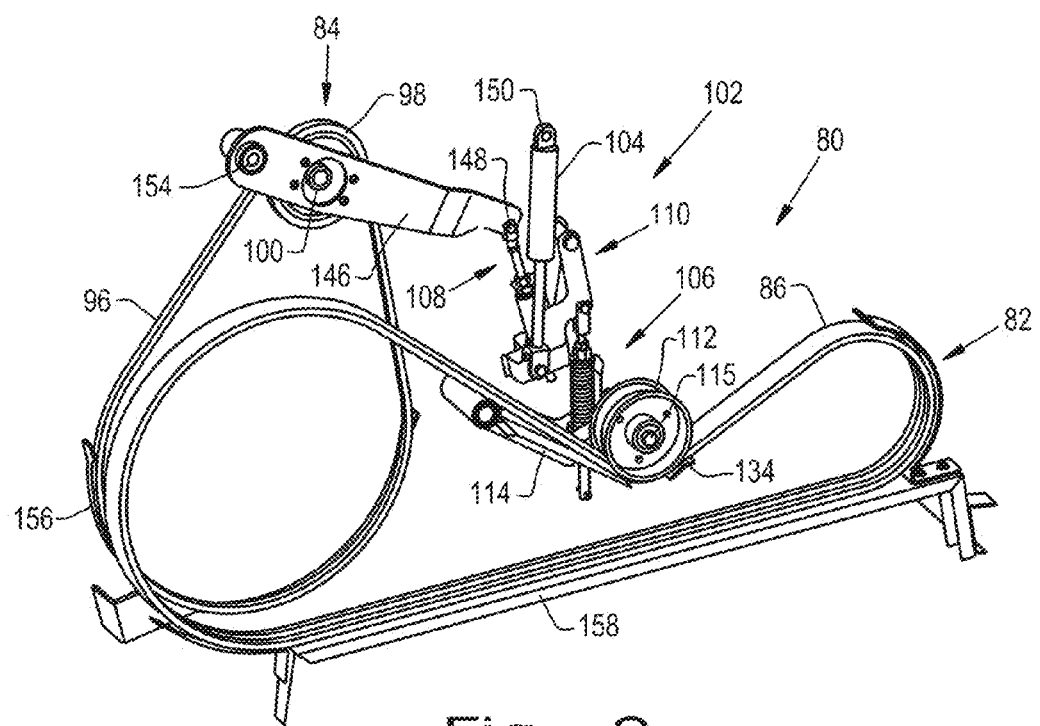
FIG. 9 is a perspective view of the reversing belt drive system with various pulleys, shafts and other components not shown, to more clearly illustrate the forward belt drive tensioner and reverse belt drive tensioner in one state of operation.
Figure 10:
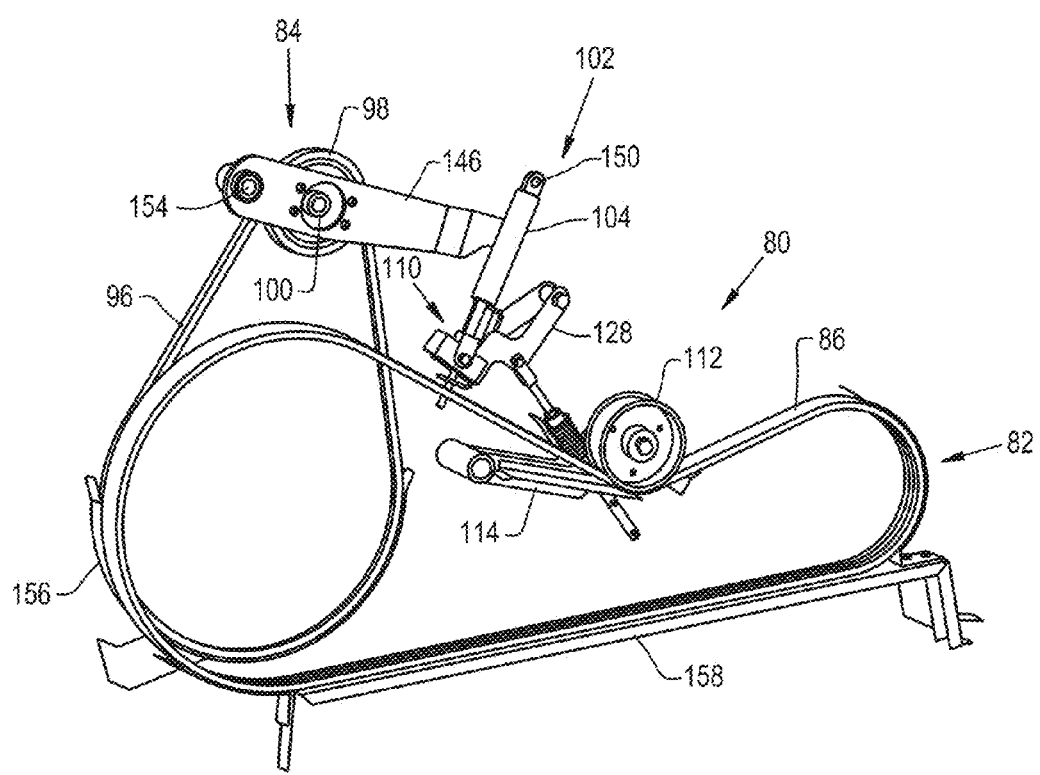
FIG. 10 is a perspective view of the reversing belt drive system similar to that shown in FIG. 9, but illustrating the forward belt drive tensioner and reverse belt drive tensioner in another state of operation, different from that shown in FIG. 9.

With reference again to FIGS. 2 & 3, as well as FIGS. 9 & 10, at an opposite end of the reverser arm 146 from pivotal connection 148 thereof to actuator rod 136, a pivotal connection 154 holds the reverser arm while allowing rotation thereabout. Reversing motor 100 is held in reverser arm 146 between the pivotal connections 148, 154. Reversing motor pulley 98 is drivingly operated by reversing motor 100 and is positioned within the loop formed by endless reverse drive belt 96. Accordingly, relative to the orientation depicted in the drawings, upward movement of reverser arm 146 at the end having pivotal connection 148 causes the opposite end of reverser arm 146 to pivot about pivotal connection 154 in a counterclockwise direction. As a consequence, reversing motor 100 and reversing motor pulley 98 move away from second pulley 92, thereby increasing the tension of reverse drive belt 96. Conversely, downward movement of reverser arm 146 at the end having pivotal connection 148 causes the opposite end of reverser arm 146 to pivot about pivotal connection 154 in a clockwise direction. As a consequence, reversing motor 100 and reversing motor pulley 98 thereof move toward second pulley 92, thereby decreasing the tension of reverse drive belt 96.

Additional belt guides or belt supports 156, 158 are provided for forward drive belt 86 and reverse drive belt 96 to maintain the association of the drive belts with the pulleys when tension is released. Belt guides or belt supports 156, 158 facilitate proper disengagement of the drive belts from the pulleys and hold the disengaged drive belts away from contact with the pulleys, but sufficiently near the pulleys when tension has been released so that the drive belts will reengage the pulleys when tension is again applied to the drive belts.

FIG. 9 and FIG. 10 are simplified illustrations showing forward belt drive arrangement 82 and reverse belt drive arrangement 84 without various pulleys and other related equipment so that the operation of integrated tensioning system 102 can be seen more clearly. FIG. 9 illustrates the normal working configuration when combine 10 is harvesting crops. Forward belt drive arrangement 82 is engaged, and reverse belt drive arrangement 84 is disengaged. Actuator 104 is extended, having caused engagement arm 128 to rotate counterclockwise and reverser arm 146 to have rotated clockwise. Accordingly, forward belt drive tensioner 106 is moved against forward drive belt 86, creating tension therein sufficient to transmit driving force between first pulley 88 and a second pulley 92 through the engagement of forward drive belt 86. Clockwise rotation of reverser arm 146 has caused reversing motor pulley 98 and reversing motor 100 to move downward, creating slack in reverse drive belt 96. Reverse drive belt 96 lies idle on reversing motor pulley 98 and around second pulley 92. Reversing motor 100 remains idle.

FIG. 10 illustrates the condition when reverse belt drive arrangement 84 is engaged. Actuator 104 has been retracted, causing engagement arm 128 to rotate clockwise and reverser arm 146 to rotate counterclockwise. Accordingly, forward belt drive tensioner 106 is moved away from forward drive belt 86, creating slack therein so driving force is not transmitted between first pulley 88 and second pulley 92 by way of drive belt 86 lying loosely thereon. Counterclockwise rotation of reverser arm 146 has caused reversing motor pulley 98 and reversing motor 100 to move upwardly, creating sufficient tension in reverse drive belt 96 to transmit driving force from reversing motor 100. Reversing motor 100 is operated to move the mechanisms of feeder housing 20 opposite to their normal infeed direction. It should be understood that reversing motor 100 typically can be operated in both directions, but in the forward direction will operate much slower than the normal speed conveyed by forward belt drive arrangement 82. Accordingly, to disburse or remove clogs or clumps of crop material, the infeed mechanisms can be jogged forward and backward, as necessary. Further, with actuator 104 in an intermediate or neutral position, with neither forward drive belt 86 nor reverse drive belt 96 sufficiently tensioned for driving engagement, first pulley 88 and the second pulley 92 can be rotated manually.

Figure 11:
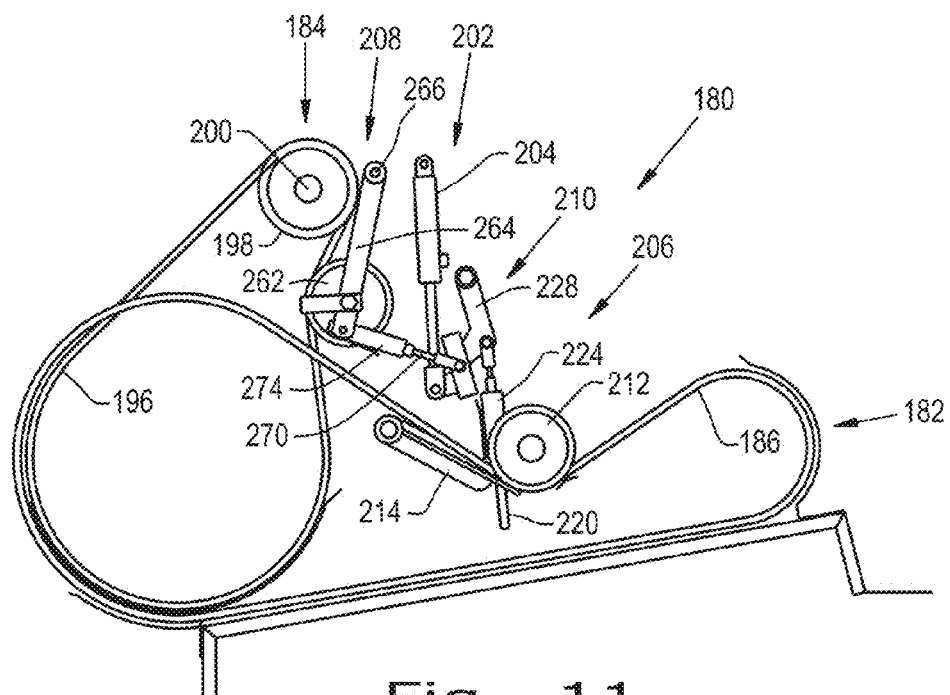
FIG. 11 is a side view of another embodiment of a reversing belt drive system, again with various pulleys, shafts and other components not shown, to more clearly illustrate a forward belt drive tensioner and a reverse belt drive tensioner of the second embodiment in one state of operation.
Figure 12:
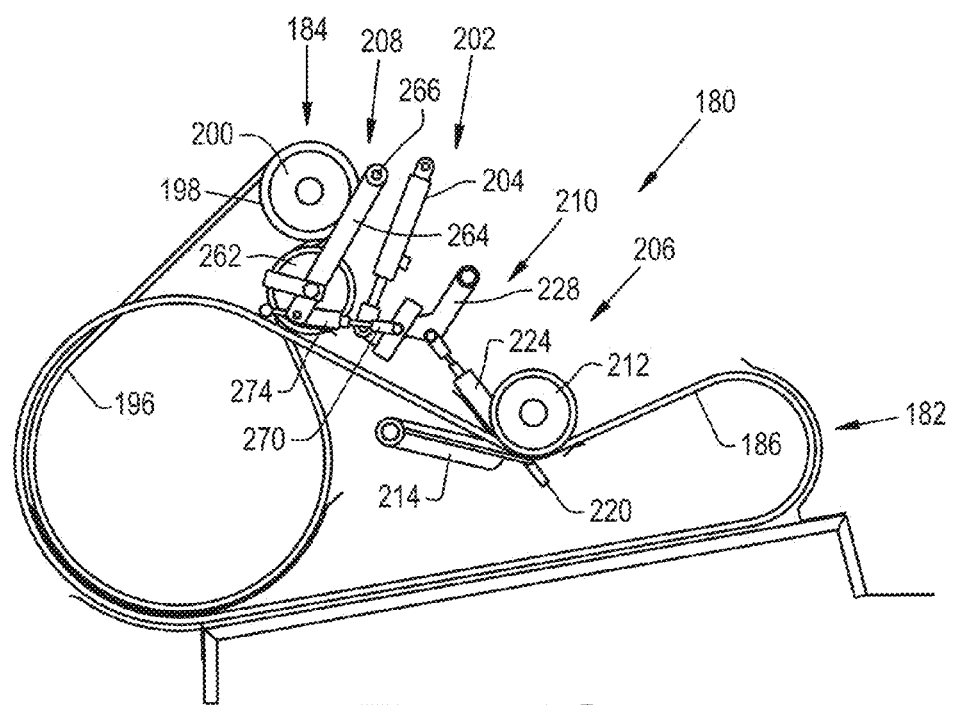
FIG. 12 is a side view of the reversing belt drive system shown in FIG. 11, but illustrating the forward belt drive tensioner and reverse belt drive tensioner of the second embodiment in another state of operation, different from that shown in FIG. 12.

The concepts of the present invention can be enacted in other ways. FIGS. 11 and 12 illustrate a reversing belt drive system 180 including a forward belt drive arrangement 182 and a reverse belt drive arrangement 184 having a forward drive belt 186 and a reverse drive belt 196, respectively. A reversing motor pulley 198 and a reversing motor 200 are provided for reverse belt drive arrangement 184. An integrated tensioning system 202 includes an actuator 204, a forward belt drive tensioner 206, a reverse belt drive tensioner 208 and an interconnecting linkage system 210. Forward belt drive tensioner 206 is substantially similar to forward belt drive tensioner 106 described previously herein, and includes an idler pulley 212 and a tensioner arm 214 similar to idler pulley 112 and tensioner arm 114 described previously. A tension rod 220 has a spring 224 and is connected to an engagement arm 228 similar to tension rod 120, spring 124 and engagement arm 128 described previously.

Reversing belt drive system 180 differs from reversing belt drive system 80 primarily in that reverse belt drive tensioner 208 is similar to forward belt drive tensioners 106 and 206. Reverse belt drive tensioner 208 includes an idler pulley 262 on a tensioner arm 264 that is connected to the machine at a pivotal attachment 266. A tension rod 270 includes a spring 274. Tension rod 270 interconnects engagement arm 228 with tensioner arm 264 similarly to the interconnection of tension rod 220 with engagement arm 228 and tensioner arm 214. In reversing belt drive system 180, reversing motor 200 and reversing motor pulley 198 are in substantially fixed position relative to reverse drive belt 196 and do not move relative to reverse drive belt 196. Tensioning or loosening of reverse drive belt 196 is caused by the movement of idler pulley 262 operated by tensioner arm 264 upon operation of actuator 204. Actuator 204 operates forward belt drive tensioner 206 and reverse belt drive tensioner 208 simultaneously, as described for the previous embodiment, through the interconnection of linkage system 210.

While this invention has been described with respect to at least one embodiment and one variation thereof, the present invention can be further modified within the scope of this disclosure and the following claims. This application is therefore intended to cover any variations, uses, or adaptations of the invention using its general principles as defined in the claims. Further, this application is intended to cover such departures from the present disclosure as come within known or customary practice in the art to which this invention pertains and which fall within the limits of the appended claims.

The invention claimed is:

1. An agricultural harvester comprising:
   a header and feeder drive system for operating a header and a feeder housing, the header and feeder chive system comprising:
      a forward belt drive arrangement comprising a first pulley, a second pulley, and a forward drive belt arranged about the first pulley and the second pulley;
      an actuator; and
      a forward belt drive tensioner connected to the actuator, the forward belt drive tensioner for engaging and disengaging the forward drive belt with the first pulley and the second pulley;
   a reverse belt drive arrangement comprising:
      a reversing motor having a reversing motor pulley selectively drivingly coupled to and decoupled from the header and feeder drive system;
      a reverse drive belt arranged around the reversing motor pulley and the second pulley;
      a reverse belt drive tensioner for engaging and disengaging the reverse drive belt with the reversing motor pulley and the second pulley; and
      a linkage system interconnecting the forward belt drive tensioner, the reverse belt drive tensioner, wherein the actuator is configured for operating both the forward belt drive tensioner and the reverse belt drive tensioner with the actuator, the linkage system comprises an engagement arm connected to the actuator, and a tensioner arm and a reverser arm each connected to the engagement arm for being moved by the actuator simultaneously.

2. The agricultural harvester of claim 1, wherein the linkage system comprises a reverser arm rotatable about a pivotal connection, and wherein the reversing motor is carried by the reverser arm.

3. The agricultural harvester of claim 1, wherein the reverse belt drive tensioner comprises an idler pulley.

4. The agricultural harvester of claim 1, wherein the actuator is a straight line actuator.

5. The agricultural harvester of claim 4, wherein the actuator is a hydraulic cylinder.

6. The agricultural harvester of claim 1, wherein the actuator is connected to the reversing motor for moving the reversing motor for adjusting tension of the reverse drive belt.

7. The agricultural harvester of claim 1, wherein the reversing motor is connected in a fixed position relative to the reverse drive belt.

8. The agricultural harvester of claim 1, wherein the reverser arm comprises a connection at one end thereof to the engagement arm and a connection at an opposite end thereof about which the reverser arm rotates, and wherein the reversing motor is carried on the reverser arm between the ends.

9. The agricultural harvester of claim 1, wherein the forward belt drive tensioner and the reverse belt drive tensioner each include an idler pulley.

10. The agricultural harvester of claim 1, wherein the reversing motor is mounted for movement toward and away from the reverse drive belt.

11. An agricultural harvester comprising:
    a header and feeder drive system for operating a header and a feeder housing, the header and feeder drive system comprising:
       a forward belt drive arrangement comprising a first pulley, a second pulley, and a forward drive belt arranged about the first pulley and the second pulley;
       an actuator; and
       a forward belt drive tensioner connected to the actuator, the forward belt drive tensioner for engaging and disengaging the forward drive belt with the first pulley and the second pulley;
    a reverse belt drive arrangement comprising:
       a reversing motor having a reversing motor pulley selectively drivingly coupled to and decoupled from the header and feeder drive system;
       a reverse drive belt arranged around the reversing motor pulley and the second pulley;
       a reverse belt drive tensioner for engaging and disengaging the reverse drive belt with the reversing motor pulley and the second pulley; and
    a linkage system interconnecting the forward belt drive tensioner, the reverse belt drive tensioner, the linkage system comprising a reverser arm rotatable about a pivotal connection and said reversing motor is carried by said reverser arm,
    wherein the actuator is configured for operating both the forward belt drive tensioner and the reverse belt drive tensioner through the linkage system by selectively engaging either the forward belt drive arrangement or the reverse belt drive arrangement.

\* \* \* \* \*